(12) United States Patent
Poppen (10) Patent No.: US 10,311,756 B1
(45) Date of Patent: Jun. 4, 2019

(54) SYSTEMS, METHODS, AND COMPUTER-READABLE MEDIA FOR VALIDATING ADDRESSES

(71) Applicant: Google Inc., Mountain View, CA (US)

(72) Inventor: Richard Frederick Poppen, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 1693 days.

(21) Appl. No.: 13/930,968

(22) Filed: Jun. 28, 2013

(51) Int. Cl.
G09B 29/00 (2006.01)
G06F 17/30 (2006.01)
G06F 17/27 (2006.01)

(52) U.S. Cl.
CPC .................................. G09B 29/006 (2013.01)

(58) Field of Classification Search
CPC .................................................... G09B 29/006
See application file for complete search history.

(56) References Cited

U.S. PATENT DOCUMENTS

| | | | |
|---|---|---|---|
| 5,311,195 A | 5/1994 | Mathis | |
| 5,706,503 A | 1/1998 | Derose | |
| 5,893,081 A | 4/1999 | Poppen | |
| 5,916,299 A | 6/1999 | Poppen | |
| 6,026,384 A | 2/2000 | Poppen | |
| 6,038,509 A | 3/2000 | Fernandez | |
| 6,377,887 B1 | 4/2002 | Poppen | |
| 7,707,164 B2 | 4/2010 | Kapochunas | |
| 7,813,873 B2 | 10/2010 | Smartt | |
| 7,859,536 B2 | 12/2010 | Poppen | |
| 8,219,578 B2 | 7/2012 | Hendrey | |
| 8,243,060 B2 | 8/2012 | Stitt | |
| 8,260,549 B2 | 9/2012 | Poppen | |
| 8,311,737 B2 | 11/2012 | Poppen | |
| 2002/0019699 A1 | 2/2002 | Bain | |
| 2006/0245572 A1* | 11/2006 | Asher | G06F 17/30241 379/220.01 |
| 2011/0064312 A1* | 3/2011 | Janky | G01C 15/00 382/195 |
| 2013/0139044 A1* | 5/2013 | Iversen | G06F 17/243 715/224 |

FOREIGN PATENT DOCUMENTS

EP          1226555 B1    10/2008

* cited by examiner

*Primary Examiner* — Mark A Fleischer
(74) *Attorney, Agent, or Firm* — Marshall, Gerstein & Borun LLP (57) ABSTRACT

Systems, methods, and computer-readable media for validating addresses of a settlement are provided. An address validation model for a settlement is generated from an address numbering system inferred from observed addresses located in the settlement, based on the assumption that a most settlements use a regular addressing scheme. The address validation model has a first axis and a second axis having headings determined from are generated by determining known address points and headings to matched points. A mapping is determined between the coordinates of the first axis and the address points and between the coordinates of the second axis and the address points. The address validation model having the mapping is used to validate addresses for the settlement. Invalid addresses may be flagged for further review by an operator.

24 Claims, 8 Drawing Sheets

SYSTEMS, METHODS, AND COMPUTER-READABLE MEDIA FOR VALIDATING ADDRESSES

BACKGROUND OF THE INVENTION

1. Field of the Invention

This invention relates generally to geographic maps and, more particularly, to validating addresses of a settlement.

2. Description of the Related Art

Computer-implemented geographic maps are useful for a variety of purposes. For example, users may interact with computer-implemented geographic maps to learn about a geographic area, to identify the location of geographically-distributed objects (e.g., man-made structures or natural features) in a geographic area, search for categories of objects in a geographic area (e.g., restaurants in a given city), identify routes between locations in a geographic area (e.g., driving directions from a current location to a desired destination), and so on.

The geographic map data may include addresses for locating residences, businesses, and other locations in a city, town, or other settlement. However, such geographic map data, especially data obtained from third-party sources, may be unreliable and may include various errors, such as misplaced addresses. The determination of address errors and the validation of existing addresses in a city, town, or other settlement may be challenging, as each city, town, or settlement may use a different address system. Moreover, the address system of a city, town, or other settlement may be difficult to determine and may not be available for correcting geographic map data.

SUMMARY OF THE INVENTION

Various embodiments of systems, methods, and computer-readable media for validating address of a settlement are provided. In some embodiments, a computer-implemented method for validating addresses is provided. The method includes obtaining, by one or more processors, a plurality of known addresses located in the settlement, each of the plurality of known addresses having an address number and identifying, by one or more processors, a plurality of points corresponding to the plurality of known addresses. Additionally, the method includes determining, by one or more processors, for each point of the plurality of points a matched point from the plurality of points based on the address number of each point and its matched point and a radial distance around each point and determining, by one or more processors, a first axis and a second axis of an address validation model from directional headings between each point of the plurality of points and its matched point. The method also includes associating, by one or more processors, a first group of the plurality of points with the first axis having first coordinates and a second group of the plurality of points with the second axis having second coordinates and assigning, by one or more processors, each point of the first group a coordinate on the first axis and each point of the second group a coordinate on the second axis. The method further includes determining, by one or more processors, a mapping of the address validation model between the first coordinates of the first axis and the address numbers first group of the plurality of points and determining, by one or more processors, a mapping of the address validation model between the second coordinates of the second axis and the address numbers of the second group of the plurality of points, and storing the address validation model having the mapping.

Additionally, in some embodiments, a non-transitory tangible computer-readable storage medium having executable computer code stored thereon for validating address in a settlement. The code includes a set of instructions that causes one or more processors to perform the following: obtaining, by one or more processors, a plurality of known addresses located in the settlement, each of the plurality of known addresses having an address number and identifying, by one or more processors, a plurality of points corresponding to the plurality of known addresses. Additionally, the code further includes a set of instructions that causes one or more processors to perform the following: determining, by one or more processors, for each point of the plurality of points a matched point from the plurality of points based on the address number of each point and its matched point and a radial distance around each point and determining, by one or more processors, a first axis and a second axis of an address validation model from directional headings between each point of the plurality of points and its matched point. The code also includes a set of instructions that causes one or more processors to perform the following: associating, by one or more processors, a first group of the plurality of points with the first axis having first coordinates and a second group of the plurality of points with the second axis having second coordinates and assigning, by one or more processors, each point of the first group a coordinate on the first axis and each point of the second group a coordinate on the second axis. The code also includes a set of instructions that causes one or more processors to perform the following: determining, by one or more processors, a mapping of the address validation model between the first coordinates of the first axis and the address numbers first group of the plurality of points and determining, by one or more processors, a mapping of the address validation model between the second coordinates of the second axis and the address numbers of the second group of the plurality of points, and storing the address validation model having the mapping.

In other embodiments, a system for validating addresses of a settlement is provided. The system includes one or more processors and a tangible non-transitory memory accessible by the one or more processors, the memory having computer code stored thereon. The code includes a set of instructions that causes one or more processors to perform the following: obtaining, by one or more processors, a plurality of known addresses located in the settlement, each of the plurality of known addresses having an address number and identifying, by one or more processors, a plurality of points corresponding to the plurality of known addresses. Additionally, the code further includes a set of instructions that causes one or more processors to perform the following: determining, by one or more processors, for each point of the plurality of points a matched point from the plurality of points based on the address number of each point and its matched point and a radial distance around each point and determining, by one or more processors, a first axis and a second axis of an address validation model from directional headings between each point of the plurality of points and its matched point. The code also includes a set of instructions that causes one or more processors to perform the following: associating, by one or more processors, a first group of the plurality of points with the first axis having first coordinates and a second group of the plurality of points with the second axis having second coordinates and assigning, by one or more processors, each point of the first group a coordinate on the first axis and each point of the second group a coordinate on the second axis. The code also includes a set of instructions that causes one or more processors to perform the following: determining, by one or more processors, a mapping of the address validation model between the first coordinates of the first axis and the address numbers first group of the plurality of points and determining, by one or more processors, a mapping of the address validation model between the second coordinates of the second axis and the address numbers of the second group of the plurality of points, and storing the address validation model having the mapping.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for validating addresses of a settlement. An address validation model for a settlement is generated from an address numbering system inferred from observed addresses located in the settlement, based on the assumption that most settlements use a regular addressing scheme. The observed addresses are obtained and points are identified from the addresses by discarding street names and converting address segments and ranges to specific points. Each point is matched with another point within a selected radius and having a most nearly equal address number. The headings between each point and its match are identified, and a histogram of the headings modulo 180 degrees is made.

If the histogram has two clear peaks about 90 degrees apart that indicate two axes of an addressing scheme, the histogram is further processed to complete generation of the address validation model. The centers of each peak in the histogram are identified, and the heading at each peak is used as the heading of each axis of the address validation model. A scale is then applied to each axis, and each point is associated with one of the two axis based on the heading between each point and its match. The associated points are assigned coordinates along their respective associated axes. A mapping between the coordinates of each axis and the address number of each point is determined, such as by a least-squares line fit based on the axis coordinates and the address numbers. The completed address validation model may then be tested using actual addresses to determine if the address validation model fits the settlement. If it does, the address validation model may then be used to validate stored addresses. Addresses that are invalid according to the address validation model may be flagged for further review by an operator.

Figure 1A:
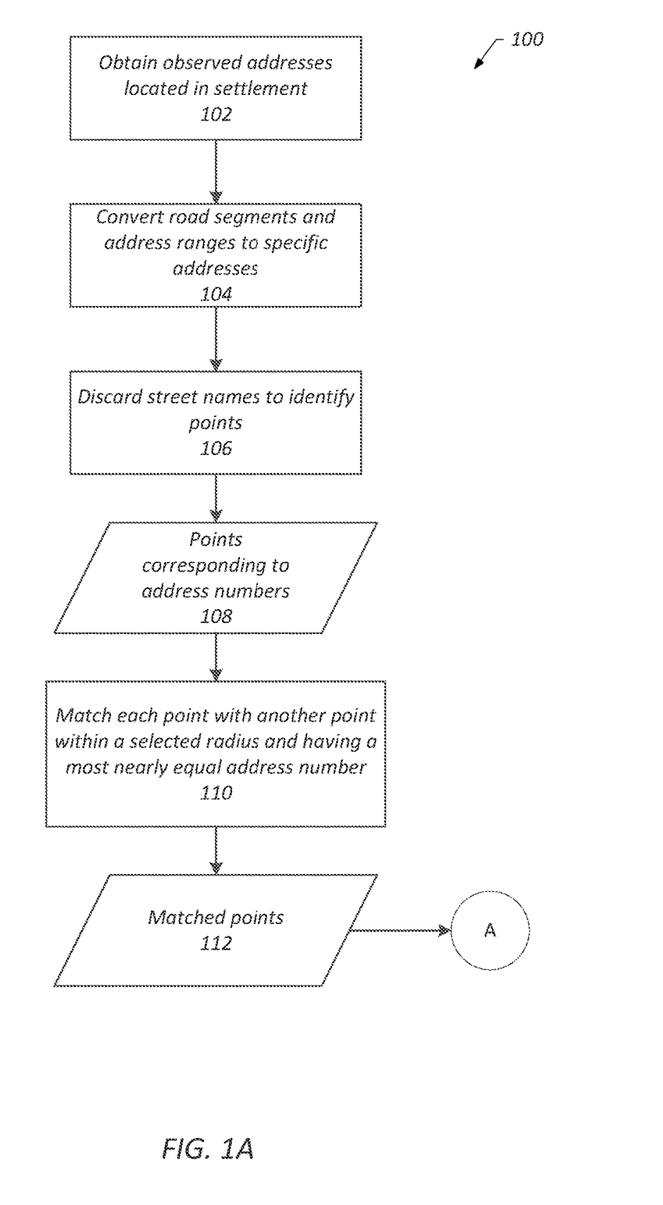
FIGS. 1A-1C are block diagrams depicting a process for generating an address validation model in accordance with an embodiment of the present invention.
Figure 1B:
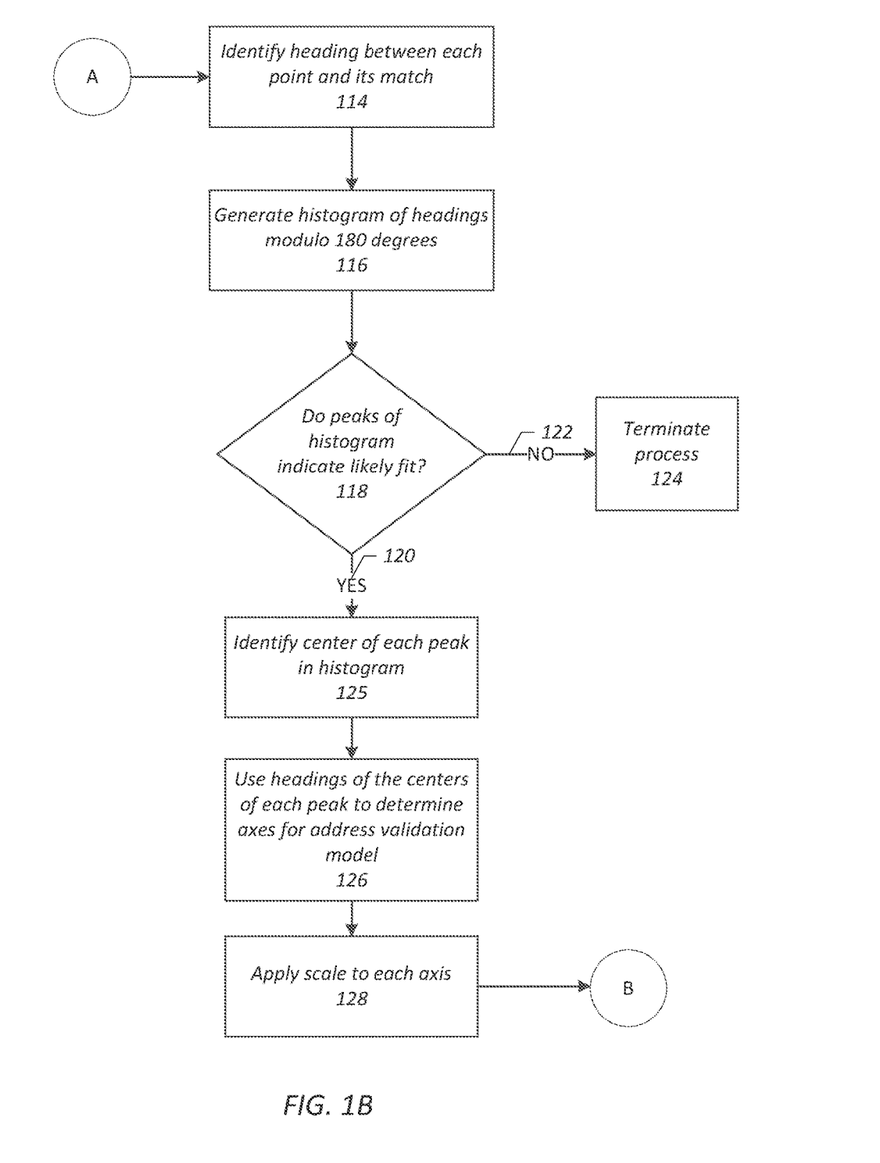
Figure 1C:
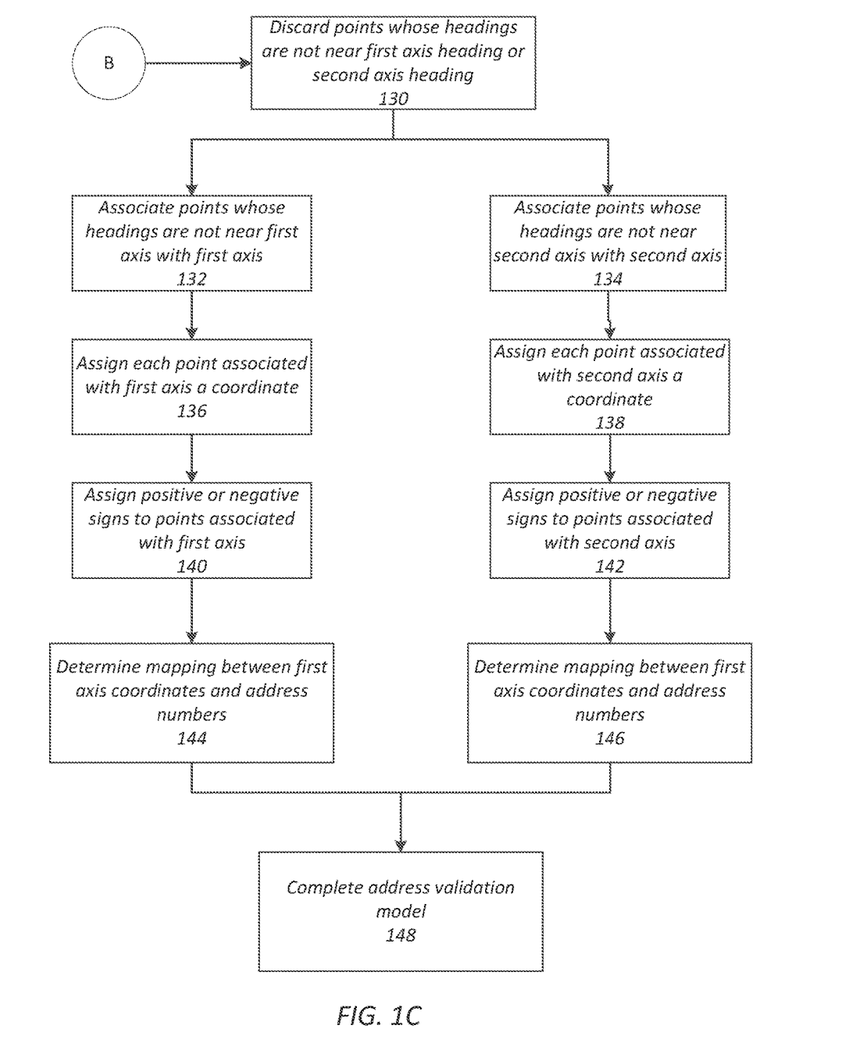

FIGS. 1A-1C depict a process 100 for generating an address validation model in accordance with embodiments of the present invention. Some or all steps of the process 100 may be implemented as executable computer code stored on a non-transitory tangible computer-readable storage medium and executed by one or more processors of a special-purpose machine, e.g., a computer programmed to execute the code. As explained further below, the address numbering system in a city or other settlement is inferred from observed addresses located in the settlement based on the assumption that most settlements use a regular addressing scheme. After determining an address validation model for a selected settlement, individual addresses obtained from geographic data are validated against the address validation model and invalid addresses are flagged for review.

Initially, observed addresses located in a settlement, such as a city, town, village, and the like, are obtained (block 102). In some embodiments, the observed addresses include road segments and address ranges (e.g., 100-199 S. First Ave). In these embodiments, the road segments and address ranges are converted to specific addresses (block 104). For example, in some embodiments, a road segment is converted to a specific address by determining the midpoint of the road segment (e.g., by selecting a point halfway down the arc length of the road segment). Similarly, in some embodiments an address range is converted to a specific address by determining the midpoint of the address range (e.g., by adding the low end of the address range to the high end of the address range and dividing by two). Next, the street names associated with the addresses are discarded (block 106) to identify points only having an address number (block 108). For example, an address of "12 Second St." is modified to a point having an address number "12." In some embodiments, directional indicators, such as W, S, N, NE, and the like, are not discarded and remain associated with an address number of a point.

Next, each point is matched with another point having a most nearly equal address number and within a predetermined radius (block 110) to generate matched points 112. In some embodiments, the matching is also based on the distance between two points, such that a point is matched with the nearest point of two possible matches having most nearly equal address numbers. Moreover, in some embodiments, points having inconsistent directional indicators are not matched (e.g., 500 N is not matched with 500 E), but points having no directional indicators are matched to points having directional indicators (e.g., 500 S is matched with 500). For example, as shown in the geographic map schematic 200 illustrated in FIG. 2, the point 202 (address number 500) is matched with point 204 (address number 501), Thus, point 204 is the most nearly equal address number to point 500 within a specified radius. Point 206 (address number 502) is not matched to point 202 (address number 500), as address number 502 is not as nearly equal to address number 500. In this manner, each point is matched to another point within a predetermined radius and having a most nearly equal address number. Moreover, it should be appreciated that point matches may not be reciprocal, e.g., point 202 is matched with point 204 but point 204 may not be matched with point 202. Additionally, some points may not have a matched point. Moreover, some embodiments may include a minimum address number threshold such that two points are not matched if the difference between the address numbers is greater than the minimum address number threshold.

Figure 2:
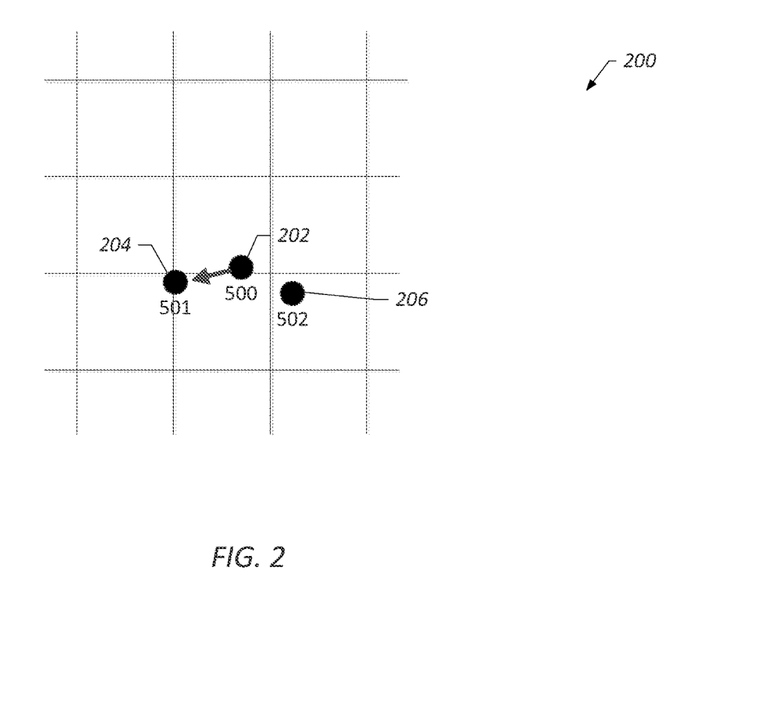
FIG. 2 is a diagram of a points and a point heading in accordance with an embodiment of the present invention.
Figure 3:
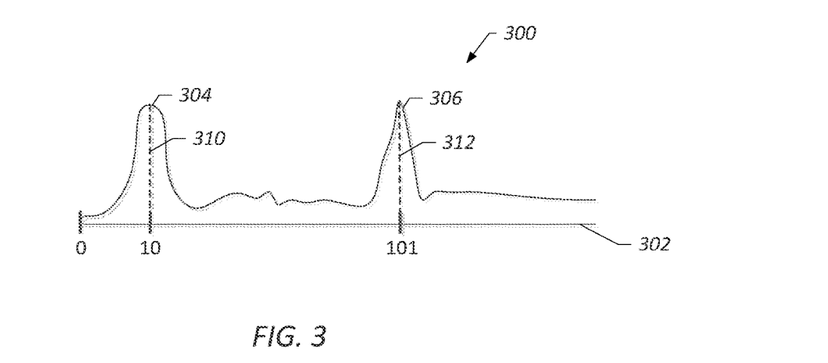
FIG. 3 is a graph of a histogram generated from point headings in accordance with an embodiment of the present invention.

As indicated by connection block A, the process 100 is further illustrated in FIG. 1B. As shown in FIG. 1B, the heading of each point is identified based on the direction to its matched point (block 114). For example, as shown in FIG. 2, the heading between point 202 and point 204 is approximately 190 degrees, as measured counterclockwise, with 0 degrees representing east. It should be appreciated that, in other embodiments, the heading may be measured clockwise, or with 0 degrees representing north or other directions or other directions. Next, a histogram of the point headings modulo 180 degrees is generated (block 116). Thus, the 190 degree heading between points 202 and 204 becomes a 10 degree heading. An example of a histogram 300 is depicted in FIG. 3. As shown in this figure, the histogram 300 includes an axis 302 having a scale of degrees. The histogram is evaluated to determine if the address validation model will likely fit the selected settlement (decision block 118). If the generated histogram has two clear peaks approximately 90 degrees apart, the address validation model likely fits the current settlement associated with the obtained address data (line 120). If the generated histogram does not have two clear peaks approximately 90 degrees apart, the address model likely does not fit the current settlement associated with the obtained address data (line 122) and the address validation process is terminated (block 124). As shown in FIG. 3, the histogram 300 includes two clear peaks 304 and 306. For example, the first peak 306 is generated at 10 degrees and the second peak 306 is generated at 101 degrees. Thus, the peaks 304 and 306 are approximately 90 degrees apart and the address validation model likely fits the address data used to generate the histogram.

Figure 4:
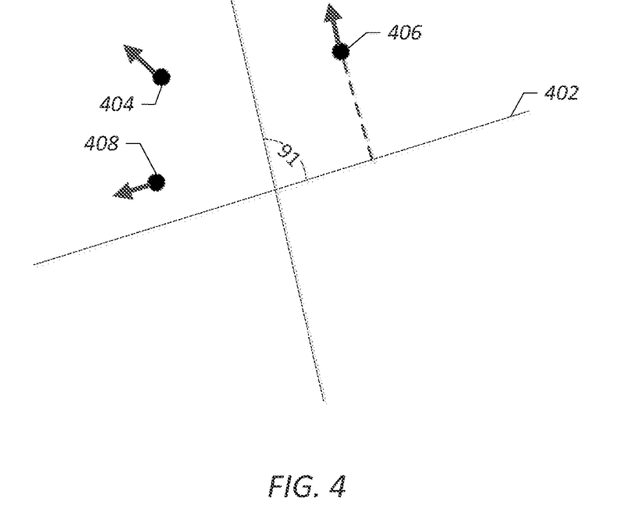
FIG. 4 is a diagram of axes of an address validation model, points and point headings in accordance with an embodiment of the present invention.

Next, the center of each peak of the generated histogram is identified (block 125). For example, as shown in FIG. 3, the center 310 of the first peak 306 and the center 312 of the second peak 308 are identified. The headings (histogram value) of the centers of each peak are used as the headings for the axes of the address validation model (block 126). For example, as shown in FIG. 3, the center 310 is at approximately 10 degrees and the center 312 is located at approximately 101 degrees. Thus, a first axis having a heading of 10 degrees and a second axis having a heading of approximately 101 degrees are used as the axes for the address validation model. FIG. 4 depicts an example of a first axis 402 (referred to as the "x-axis" and a second axis 400 (referred to as the "y-axis" of an address validation model determined from the example histogram illustrated in FIG. 3. Accordingly, the first axis 400 of FIG. 4 has a heading of 10 degrees and the second axis 402 of FIG. 4 has a heading of 101 degrees.

A scale is then applied to each axis (block 128) starting from intersection of the axes. For example, the scale may be applied by measuring coordinates in a distance unit (e.g., meters) from the intersection of the axis. As indicated by connection block B, the process 100 is further illustrated in FIG. 1C. Next, points are discarded that do not have headings within a heading threshold from the first axis or the second axis of the address validation model (block 130). With reference to FIG. 4, for example, a point 404 having a heading of 130 degrees that is greater than the heading threshold (e.g., 5 degrees) from the 101 degree heading of axis 400 or the 10 degree heading of axis 402 may be discarded. In contrast, a point 406 having a heading of 102 degrees that is nearly parallel with the 101 degree heading of axis 400 is not discarded. Next, points having headings that are not near the heading of the first axis (i.e., headings that are approximately 90 degrees from the heading of the first axis) are associated with the first axis (block 132). For example, points having headings substantially near the heading of the second axis are associated with the first axis. As shown in FIG. 4, for example, a point 406 having a heading of 102 degrees that is nearly parallel to the 101 degree heading of the second axis 400 is associated with the first axis 402. Similarly, points having headings that are not near the second axis (i.e., having headings that are approximately 90 degrees from the heading of the second axis) are associated with the second axis (block 134). For example, points having headings substantially near the heading of the first axis are associated with the second axis. As shown in FIG. 4, for example, a point 408 having a heading that is nearly parallel to the first axis 402 is associated with the second axis 404.

Each point associated with the first axis is assigned a first axis coordinate (block 136). For example, a line parallel to the second axis is drawn from an associated point to the first axis to determine the first axis coordinate. Similarly, each point associated with the second axis is assigned a second axis coordinate (block 138). For example, a line parallel to the first axis is drawn from an associated point to the second axis to determine the second axis coordinate. Thus, the dataset includes points associated with the first axis and having a first axis coordinate and an address number, and points associated with the second axis and having a second axis coordinate and an address number.

Next, positive and negative signs are assigned to the points associated with the first axis based on a mathematical evaluation of increasing or decreasing address numbers along the first axis (block 140). This is done since the model allows for addresses to increase as they get more distant from a central location (e.g., a point in the historic downtown) in the settlement. For example, addresses may increase while heading both east and west from city hall. In some embodiments, a local curve fit is applied to each point and its immediate neighbors based on their first axis coordinates and the absolute value of their address numbers. In some embodiments, the curve fit is a least squares fit to the first axis coordinates and address numbers. If the curve fit is within a quality threshold and indicates that the address numbers around a given point increase to the west direction, the address of the given point is made negative. If the curve fit is within the quality threshold and indicates that the address numbers around the given point increase to the east direction, the address of the given point is left positive. If the curve fit does not meet the quality threshold, the selected point may be discarded.

Similarly, points are associated with the second axis based on a mathematical evaluation of increasing or decreasing address numbers along the second axis (block 142). Here again, a local curve fit, such as a least squares fit, is applied to each point and its immediate neighbors based on their first axis coordinates and their address numbers. Based a quality threshold and whether the address numbers around a given point increase to the north or south, a positive or negative sign is assigned to the address number of the given point.

Figure 5:
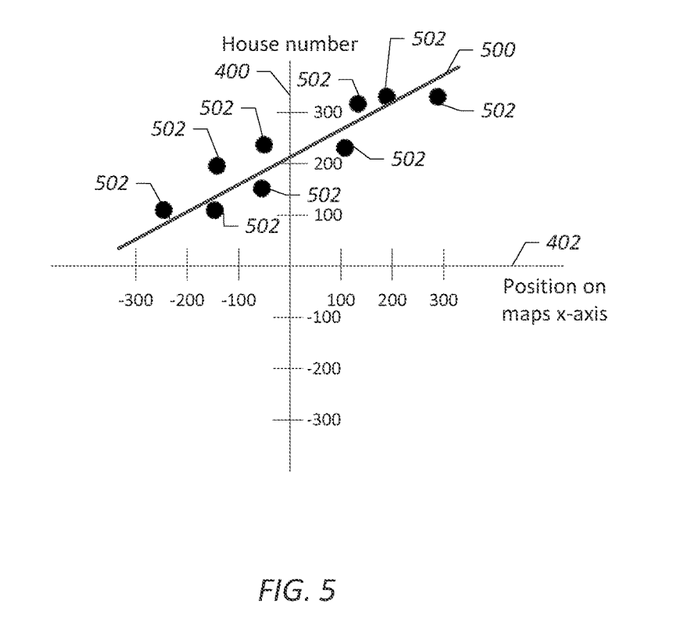
FIG. 5 is a diagram of a line fit for an address validation model in accordance with an embodiment of the present invention.

After assigning signs to address numbers, a least-squares line fit based on the first axis coordinates and the signed address numbers is applied to all of the points associated with the first axis to calibrate a mapping between the first axis coordinates and the address numbers (block 144). In a similar manner, a least squares line fit based on the second axis coordinates and the signed address numbers is applied to all of the points associated with the second axis to calibrate a mapping between the second axis coordinates and the signed address numbers (block 146). For example, FIG. 5 depicts a least-squares fit line 500 between points 502 assigned to the first axis based on the address numbers and the coordinates of the first axis 402. In a similar manner, another least-squares line fit is applied to the points associated with the second axis 400 based on the address numbers and the coordinates of the second axis 400. After determining a calibration, the address validation model is completed (block 148) and may be used to validate addresses.

In some embodiments, the address validation model may be tested against all address points in the settlement (including additional points not used to generate the address validation model). The testing may include determining the x-coordinates and y-coordinates of an observed address point and determining an east/west address number from the first axis (x-axis) and a north/south address number from the second axis (y-axis). The determined coordinates may be referred to as "derived address numbers." In such embodiments, address points having a north or south designation will not have x-coordinate address numbers and address points having an east or west address number will not have y-coordinate address numbers. If the address number of an actual address point is within a predetermined distance to one of the two derived address numbers for most (e.g., a threshold percentage) of the actual address points, the address validation model is determined to fit the settlement and calibrated address numbers based on the model are possible. For example, if the observed address point is 145 Main St, but the model indicates the address is 125 Main St., this may be an indicator that the model fits well or poorly. In some embodiments, the threshold percentage may be 95% or greater, though other thresholds are, of course, possible. If the address validation model fits a settlement, operators may use the address validation model to manually check the stored address points that do not have derived addresses near the stored address numbers. The address validation model may also be used to estimate address for streets which do not have stored address information.

Figure 6:
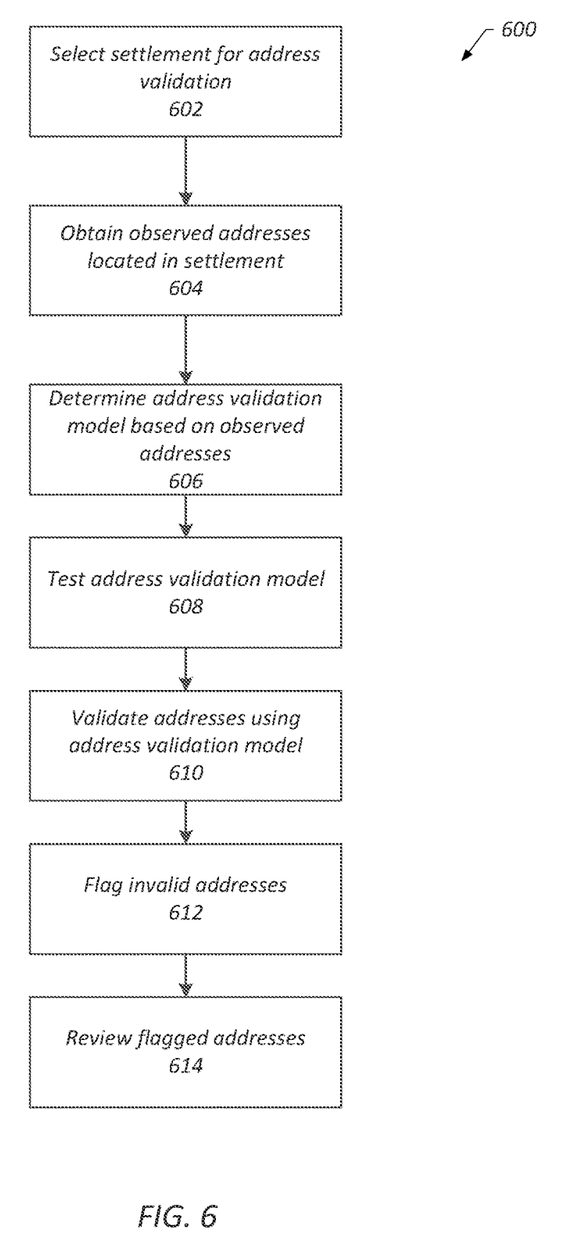
FIG. 6 is a block diagram of a process for validating address of a settlement in accordance with an embodiment of the present invention.

FIG. 6 depicts a process 600 for address validation in accordance with an embodiment of the present invention. Some or all steps of the process 600 may be implemented as executable computer code stored on a non-transitory tangible computer-readable storage medium and executed by one or more processors of a special-purpose machine, e.g., a computer programmed to execute the code. Initially, a settlement, such as a city, town, and the like, is selected for address validation (block 602). Next, observed addresses in the settlement are obtained (block 604). As noted above, the observed addresses may be addresses that are manually or automatically observed within the settlement. Next, an address validation model for the settlement is generated or determined (block 606). As described above in FIGS. 1A-1D, generating the address validation model includes determining a regular addressing scheme of a settlement and generating an address numbering scheme for the settlement.

In some embodiments, after determining an address validation mode, the address validation model is tested using additional observed addresses in the settlement (block 608). For example, observed address points outside of the set of observed address points used to generate the address validation model may be used to test the validity of the model. Next, if the address validation model proves accurate, all addresses in the settlement are tested using the address validation model (block 610). Addresses that are identified as errors (i.e., invalid) by the address validation model are flagged for further review (block 612). Next, operators may review the flagged addresses (block 614), such as to determine if the addresses should be corrected or if additional data needs to be obtained.

Figure 7:
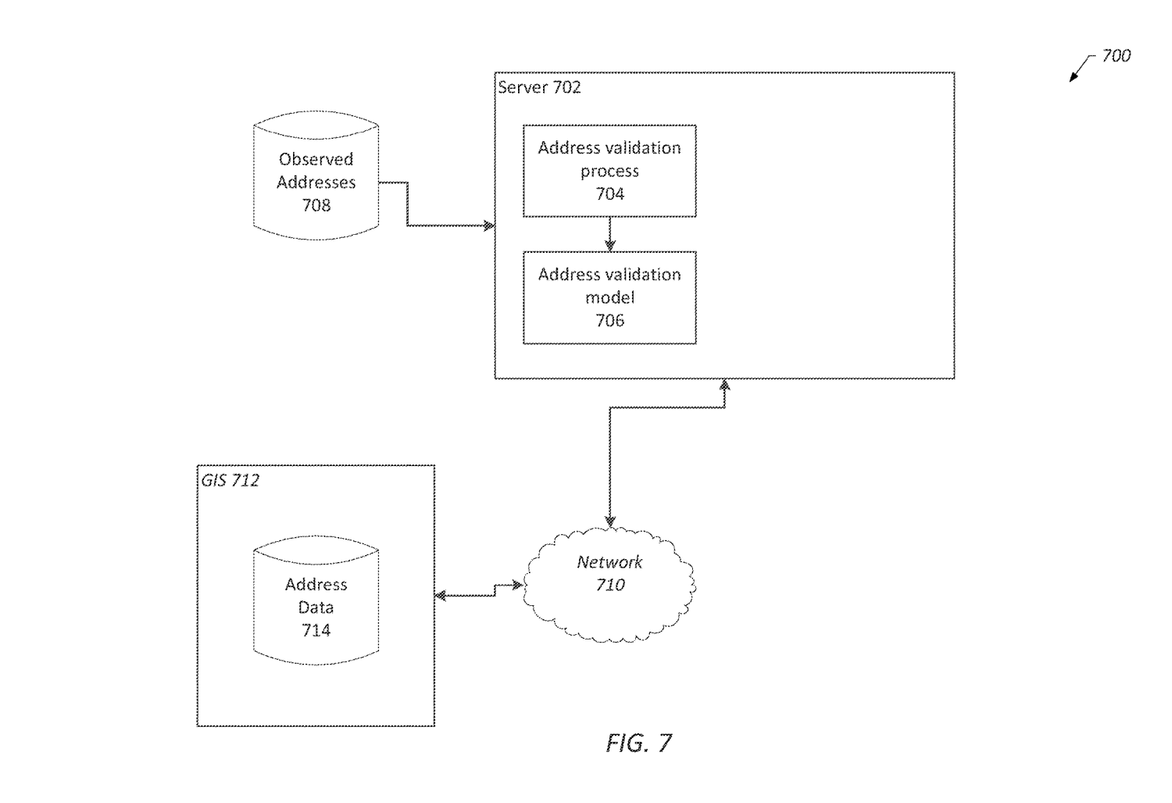
FIG. 7 is a block diagram of a system for validating address of a settlement in accordance with an embodiment of the present invention.

FIG. 7 depicts a system 700 for validating addresses of a settlement of a geographic map in accordance with embodiments of the present invention. The system 700 includes a server 702 (e.g., one or more servers) having an address validation process 704 that generates an address validation model 706, as described above and illustrated in FIGS. 1A-1C. As described above, the server 702 may include or access observed addresses 708 for a settlement and generate the address validation model 706 based on the observed addresses 708.

The server 702 is in communication with a network 710 and may communicate with a geographic information system (GIS) 712 via the network 710. In some embodiments, the server 702 may be a part of the GIS 712. The server 702 may be a single server (in a discrete hardware component or as a virtual server) or multiple servers. The server 702 may include web servers, application servers, or other types of servers. Additionally, the server 702 may be, for example, computers arranged in any physical and virtual configuration, such as computers in one or more data processing centers, a distributed computing environment, or other configuration. Such configurations may use the network 710 for communication or may communicate over other networks.

The server 702 and GIS 712 are in communication with the network 710, such as through a wired or wireless network interface. In some embodiments, the network 710 may include multiple networks, and may include any suitable network and networking technology, such as the Internet, an intranet, a local area network (LAN), a wide area network (WAN), or any other suitable network. Additionally, the network 710 may include a wired network, a wireless network, or both. Moreover, it should be appreciated that the server 702 and GIS 712 may communicate over different networks separately and simultaneously. Additionally, other components of the system 700 may communicate over the network 712 or different networks.

The GIS 712 may be implemented on a server (e.g., one or more servers) and may include different types of servers arranged in any physical and virtual configuration. The GIS 712 may include address data 714 that may be used for generating the address validation model 706 or may be validated against the address validation model 706. For example, the address data 714 may be obtained from third parties or other sources and may be validated using the address validation model 706. As described above, in some embodiments addresses that are unable to be validated using the address validation model 706 are flagged for review. The flagged address may be provided to an operator and correct or removed. For example, in some embodiments a computer, such as a laptop computer, desktop computer, tablet computer, or the like, may communicate with the server 702 and the GIS 712 to enable an operator to review flagged addresses and enter correct address data or remove invalid address data.

Figure 8:
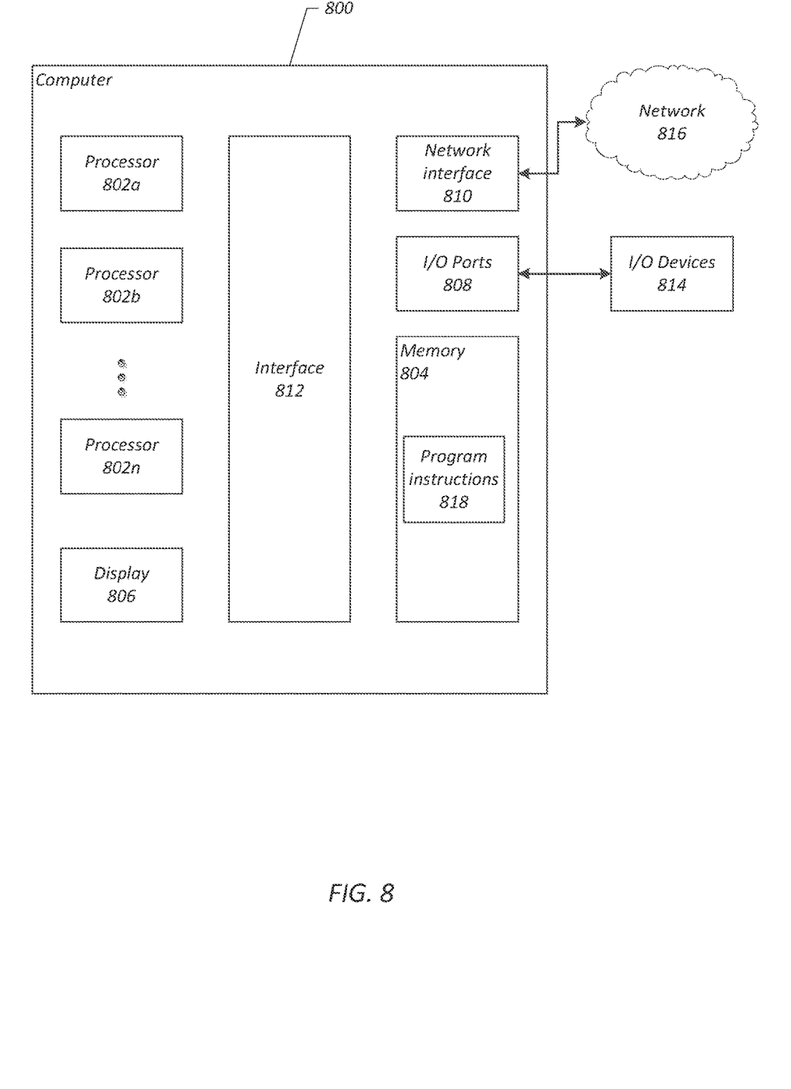
FIG. 8 is a block diagram of a computer in accordance with an embodiment of the present invention.

FIG. 8 depicts a computer 800 (e.g., a server) in accordance with an embodiment of the present invention. Various portions or sections of systems and methods described herein include or are executed on one or more computers similar to computer 800 and programmed as special-purpose machines executing some or all steps of processes described above as executable computer code. Further, processes, modules, and other components described herein may be executed by one or more processing systems similar to that of computer 800.

The computer 800 may include various components that contribute to the function of the device and enable the computer 800 to function in accordance with the techniques discussed herein. As will be appreciated, some components of computer 800 may be provided as internal or integral components of the computer 800 and some components may be provided as external or connectable components. Moreover, FIG. 8 depicts one example of a particular implementation and is intended to illustrate the types of components and functions that may be present in various embodiments of the computer 800.

Computer 800 may include a combination of devices or software that may perform or otherwise provide for the performance of the techniques described herein. For example, computer 800 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 800 may be a unified device providing any one of or a combination of the functionality of a media player, a cellular phone, a personal data organizer, a game console, and so forth. Computer 800 may be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. As shown in the embodiment illustrated in FIG. 8, the computer 800 may include one or more processors (e.g., processors 802*a*-802*n*), a memory 804, a display 806, I/O ports 808 a network interface 810, and an interface 812. Additionally, the computer 800 may include or be coupled to I/O devices 814.

In addition, the computer 800 may allow a user to connect to and communicate through a network 816 (e.g., the Internet, a local area network, a wide area network, etc.) and, in some embodiments, to acquire data from a satellite-based positioning system (e.g., GPS). For example, the computer 800 may allow a user to communicate using e-mail, text messaging, instant messaging, or using other forms of electronic communication, and may allow a user to obtain the location of the device from a satellite-based positioning system.

In some embodiments, the display 806 may include a liquid crystal display (LCD) an organic light emitting diode (OLED) display, or other display types. The display 806 may display a user interface (e.g., a graphical user interface) executed by the processor 802 of the computer 800. The display 806 may also display various indicators to provide feedback to a user, such as power status, call status, memory status, network status etc. These indicators may be incorporated in the user interface displayed on the display 806. In some embodiments, the display 806 may include or be provided in conjunction with touch sensitive elements through which a user may interact with the user interface. In such embodiments, a touch-sensitive display may be referred to as a "touch screen" and may also be known as or called a touch-sensitive display system.

The processor 802 may provide the processing capability to execute the operating system, programs, user interface, and other functions of the computer 800. The processor 802 may include one or more processors and may include "general-purpose" microprocessors, special purpose microprocessors, such as application-specific integrated circuits (ASICs), or any combination thereof. In some embodiments, the processor 802 may include one or more reduced instruction set (RISC) processors, such as those implementing the Advanced RISC Machine (ARM) instruction set. Additionally, the processor 802 may include single-core processors and multicore processors and may include graphics processors, video processors, and related chip sets. Accordingly, the computer 800 may be a uni-processor system having one processor (e.g., processor 802*a*), or a multi-processor system having two or more suitable processors (e.g., 802*a*-802*n*). Multiple processors may be employed to provide for parallel or sequential execution of the techniques described herein. Processes, such as logic flows, described herein may be performed by the processor 802 executing one or more computer programs to perform functions by operating on input data and generating corresponding output. The processor 802 may receive instructions and data from a memory (e.g., system memory 804).

The memory 804 (which may include one or more tangible non-transitory computer readable storage mediums) may include volatile memory and non-volatile memory accessible by the processor 802 and other components of the computer 800. The memory 804 may store a variety of information and may be used for a variety of purposes. For example, the memory 804 may store executable computer code, such as the firmware for the computer 800, an operating system for the computer 800, and any other programs or other executable code for providing functions of the computer 800. Such executable computer code may include program instructions 818 executable by a processor (e.g., one or more of processors 802*a*-802*n*) to implement one or more embodiments of the present invention. Program instructions 818 may include modules of computer program instructions for implementing one or more techniques described herein. Program instructions 818 may include a computer program (which in certain forms is known as a program, software, software application, script, or code). A computer program may be written in a programming language, including compiled or interpreted languages, or declarative or procedural languages. A computer program may include a unit suitable for use in a computing environment, including a stand-alone program, a module, a component, a subroutine, and the like. A computer program may or may not correspond to a file in a file system. A computer program may be stored in a section of a file that holds other computer programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more processors located locally at one site or distributed across multiple remote sites and interconnected by a communication network. Additionally, the memory 804 may be used for buffering or caching during operation of the computer 800.

As mentioned above, the memory 804 may include volatile memory, such as random access memory (RAM). The memory 804 may also include non-volatile memory, such as ROM, flash memory, a hard drive, other suitable optical, magnetic, or solid-state storage mediums or any combination thereof. The memory 804 may store data files such as media (e.g., music and video files), software (e.g., for implementing functions on computer 800), user preference information, payment transaction information, wireless connection information, contact information (e.g., an address book), and any other suitable data.

The interface 812 may include multiple interfaces and may enable communication between various components of the computer 800, the processor 802, and the memory 804. In some embodiments, the interface 812, the processor 802, memory 804, and one or more other components of the computer 800 may be implemented on a single chip, such as a system-on-a-chip (SOC). In other embodiments, these components, their functionalities, or both may be implemented on separate chips. The interface 812 may coordinate I/O traffic between processors 802a-802n, the memory 804, the network interface 810, 814, or any other devices or a combination thereof. The interface 812 may perform protocol, timing or other data transformations to convert data signals from one component (e.g., the memory 804) into a format suitable for use by another component (e.g., processors 802a-802n). The interface 812 may implement various types of interfaces, such as Peripheral Component Interconnect (PCI) interfaces, the Universal Serial Bus (USB) interfaces, Thunderbolt interfaces, Firewire (IEEE-1394) interfaces, and so on.

The computer 800 may also include input and output ports 808 to enable connection of additional devices, such as I/O devices 814. Embodiments of the present invention may include any number of input and output ports 808, including headphone and headset jacks, universal serial bus (USB) ports, Firewire (IEEE-1394) ports, Thunderbolt ports, and AC and DC power connectors. Further, the computer 800 may use the input and output ports to connect to and send or receive data with any other device, such as other portable computers, personal computers, printers, etc.

The computer 800 depicted in FIG. 8 also includes a network interface 810. The network interface 810 may include a wired network interface card (NIC), a wireless (e.g., radio frequency) network interface card, or combination thereof. The network interface 810 may include known circuitry for receiving and sending signals to and from communications networks, such as an antenna system, an RF transceiver, an amplifier, a tuner, an oscillator, a digital signal processor, a modem, a subscriber identity module (SIM) card, memory, and so forth. The network interface 810 may communicate with networks (e.g., network 816), such as the Internet, an intranet, a cellular telephone network, a wide area network (WAN), a local area network (LAN), a metropolitan area network (MAN), or other devices by wired or wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11 standards), voice over Internet Protocol (VoIP), Wi-MAX, an email protocol (e.g., Internet message access protocol (IMAP) or post office protocol (POP)), message-oriented protocols (e.g., extensible messaging and presence protocol (XMPP), Multimedia Messaging Service (MMS), Short Message Service (SMS), or any other suitable communications standards, protocols, and technologies.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for validating addresses of a settlement, comprising:

obtaining, by one or more processors from a server, address data that specifies a plurality of addresses located in the settlement and observed manually or automatically, each of the plurality of observed addresses having an address number;

for each of the plurality of observed addresses:
  selecting, by the one or more processors from among the plurality of observed addresses, a matched observed address within a certain fixed radius of the observed address, when a difference in address numbers between the observed address and the matched observed address is not greater than a minimum address number threshold, and
  determining, by the one or more processors, a directional heading from the observed address to the matched observed address, to generate a respective directional heading for each of the plurality of observed addresses;

using a distribution of the generated directional headings for the plurality of observed addresses, identifying (i) a first axis and a second axis such that respective address numbers for at least some of the plurality of observed addresses correspond to coordinates along the first axis or the second axis, (ii) a respective scale to be applied to the first axis and the second axis to provide the coordinates along the first axis or the second axis, wherein the first axis, the second axis, and the respective scales define components of an address validation model;

receiving, by the one or more processors, an address to be tested;

applying, by the one or more processors, the address validation model to the address to be tested to determine whether the address fits the address validation model; and generating an indication of whether the address likely contains an error when the address does not fit the address validation model.

2. The computer-implemented method of claim 1, further comprising:
  for each of the plurality of observed addresses, discarding a street name and converting the observed address into a point.

3. The computer-implemented method of claim 2, wherein the plurality of observed addresses includes an address range, and wherein converting the address range to a point includes determining a midpoint of the address range.

4. The method of claim 2, further comprising:
  for each of the plurality of points, (i) associating the point with the first axis if the directional heading generated for the point is not greater than a heading threshold from the first axis or with the second axis if the directional heading generated for the point is greater than the heading threshold from the second axis, or (ii) discarding the point if the directional heading generated for the point is greater than the heading threshold from both the first axis and the second axis;
  for each of the plurality of points associated with one of the axis, assigning a coordinate to the point along the axis with which the point is associated; and
  generating a mapping between the address numbers of the plurality of observed addresses and the first and second axis.

5. The method of claim 4, further comprising applying a least squares line fit to the points associated with the first axis based on the assigned coordinates and the address numbers.

6. The method of claim 2, wherein the plurality of observed addresses includes a road segment, and wherein converting the road segment to a point includes selecting a point halfway down an arc length of the road segment.

7. The computer-implemented method of claim 1, wherein using the distribution of the generated directional headings to identify the first axis and the second axis comprises:
  applying a modulo 180 degrees operation to each of the determined directional headings to generate a histogram for the plurality of observed addresses;
  identifying a first peak and a second peak in the histogram;
  determining the heading of the first axis from a center of the first peak; and
  determining the heading of the second axis from a center of the second peak.

8. The computer-implemented method of claim 1, wherein the settlement comprises a city.

9. A non-transitory tangible computer-readable storage medium having executable computer code stored thereon for validating addresses of settlement, the code comprising a set of instructions that causes one or more processors to perform a method comprising:
  obtaining, by one or more processors from a server, address data that specifies a plurality of addresses located in the settlement and observed manually or automatically, each of the plurality of observed addresses having an address number;

for each of the plurality of observed addresses:
  selecting, by the one or more processors from among the plurality of observed addresses, a matched observed address within a certain fixed radius of the observed address, when a difference in address numbers between the observed address and the matched observed address is not greater than a minimum address number threshold, and
  determining, by the one or more processors, a directional heading from the observed address to the matched observed address, to generate a respective directional heading for each of the plurality of observed addresses;

using a distribution of the generated directional headings for the plurality of observed addresses, identifying (i) a first axis and a second axis such that respective address numbers for at least some of the plurality of observed addresses correspond to coordinates along the first axis or the second axis, (ii) a respective scale to be applied to the first axis and the second axis to provide the coordinates along the first axis or the second axis, wherein the first axis, the second axis, and the respective scales define components of an address validation model;

receiving, by the one or more processors, an address to be tested;

applying, by the one or more processors, the address validation model to the address to be tested to determine whether the address fits the address validation model; and generating an indication of whether the address likely contains an error when the address does not fit the address validation model.

10. The non-transitory tangible computer-readable storage medium of claim 9, the method further comprising:
  for each of the plurality of observed addresses, discarding a street name and converting the observed address into a point.

11. The non-transitory tangible computer-readable storage medium of claim 10, wherein the plurality of observed addresses includes an address range, and wherein converting the address range to a point includes determining a midpoint of the address range.

12. The non-transitory tangible computer-readable storage medium of claim 10, the method further comprising:
for each of the plurality of points, (i) associating the point with the first axis if the directional heading generated for the point is not greater than a heading threshold from the first axis or with the second axis if the directional heading generated for the point is not greater than the heading threshold from the second axis, or (ii) discarding the point if the directional heading generated for the point is greater than the heading threshold from both the first axis and the second axis;
for each of the plurality of points associated with one of the axis, assigning a coordinate to the point along the axis with which the point is associated; and
generating a mapping between the address numbers of the plurality of observed addresses and the first and second axis.

13. The non-transitory tangible computer-readable storage medium of claim 12, further comprising applying a least squares line fit to the points associated with the first axis based on the assigned coordinates and the address numbers.

14. The non-transitory tangible computer-readable storage medium of claim 10, wherein the plurality of observed addresses includes a road segment, and wherein converting the road segment to a point includes selecting a point halfway down an arc length of the road segment.

15. The non-transitory tangible computer-readable storage medium of claim 9, wherein using the distribution of the generated directional headings to identify the first axis and the second axis comprises:
applying a modulo 180 degrees operation to each of the determined directional headings to generate a histogram for the plurality of observed addresses;
identifying a first peak and a second peak in the histogram;
determining the heading of the first axis from a center of the first peak; and
determining the heading of the second axis from a center of the second peak.

16. The non-transitory tangible computer-readable storage medium of claim 9, wherein the settlement comprises a city.

17. A system for validating addresses of a settlement, the system comprising:
one or more processors;
a tangible non-transitory memory accessible by the one or more processors, the memory having computer code stored thereon, the code comprising a set of instructions that causes one or more processors to perform a method comprising:
obtaining, by one or more processors from a server, address data that specifies a plurality of addresses located in the settlement and observed manually or automatically, each of the plurality of observed addresses having an address number;
for each of the plurality of observed addresses:
selecting, by the one or more processors from among the plurality of observed addresses, a matched observed address within a certain fixed radius of the observed address, when a difference in address numbers between the observed address and the matched observed address is not greater than a minimum address number threshold, and
determining, by the one or more processors, a directional heading from the observed address to the matched observed address, to generate a respective directional heading for each of the plurality of observed addresses,
using a distribution of the generated directional headings for the plurality of observed addresses, identifying (i) a first axis and a second axis such that respective address numbers for at least some of the plurality of observed addresses correspond to coordinates along the first axis or the second axis, (ii) a respective scale to be applied to the first axis and the second axis to provide the coordinates along the first axis or the second axis, wherein the first axis, the second axis, and the respective scales define components of an address validation model;
receiving, by the one or more processors, an address to be tested;
applying, by the one or more processors, the address validation model to the address to be tested to determine whether the address fits the address validation model; and
generating an indication of whether the address likely contains an error when the address does not fit the address validation model.

18. The system of claim 17, the method further comprising:
for each of the plurality of observed addresses, discarding a street name and converting the observed address into a point.

19. The system of claim 18, wherein the plurality of observed addresses includes an address range, and wherein converting the address range to a point includes determining a midpoint of the address range.

20. The system of claim 18, wherein the method further comprises:
for each of the plurality of points, (i) associating the point with the first axis if the directional heading generated for the point is not greater than a heading threshold from the first axis or with the second axis if the directional heading generated for the point is not greater than the heading threshold from the second axis, or (ii) discarding the point if the directional heading generated for the point is greater than the heading threshold from both the first axis and the second axis;
for each of the plurality of points associated with one of the axis, assigning a coordinate to the point along the axis with which the point is associated; and
generating a mapping between the address numbers of the plurality of observed addresses and the first and second axis.

21. The system of claim 20, the method further comprising applying a least squares line fit to the points associated with the first axis based on the assigned coordinates and the address numbers.

22. The system of claim 18, wherein the plurality of observed addresses includes a road segment, and wherein converting the road segment to a point includes selecting a point halfway down an arc length of the road segment.

23. The system of claim 17, wherein using the distribution of the generated directional headings to identify the first axis and the second axis comprises:

applying a modulo 180 degrees operation to each of the determined directional headings to generate a histogram for the plurality of observed addresses;

identifying a first peak and a second peak in the histogram;

determining the heading of the first axis from a center of the first peak; and determining the heading of the second axis from a center of the second peak.

24. The system of claim 17, wherein the settlement comprises a city.

* * * * *